United States Patent
Bishara

(10) Patent No.: US 9,430,379 B1
(45) Date of Patent: *Aug. 30, 2016

(54) DYNAMIC RANDOM ACCESS MEMORY CONTROLLER

(75) Inventor: Nafea Bishara, San Jose, CA (US)

(73) Assignee: Marvell International Ltd., Hamilton (BM)

(*) Notice: Subject to any disclaimer, the term of this patent is extended or adjusted under 35 U.S.C. 154(b) by 2226 days.

This patent is subject to a terminal disclaimer.

(21) Appl. No.: 11/653,731

(22) Filed: Jan. 15, 2007

Related U.S. Application Data

(63) Continuation of application No. 10/458,049, filed on Jun. 9, 2003, now Pat. No. 7,167,942.

(51) Int. Cl.
G06F 12/00 (2006.01)
G06F 12/06 (2006.01)

(52) U.S. Cl.
CPC ................... G06F 12/0607 (2013.01)

(58) Field of Classification Search
CPC .................................................. G06F 12/0607
USPC ...................................... 711/5, 157
See application file for complete search history.

(56) References Cited

U.S. PATENT DOCUMENTS

| | | | |
|---|---|---|---|
| 5,357,606 A | 10/1994 | Adams | |
| 5,548,588 A | 8/1996 | Ganmukhi et al. | 370/395 |
| 5,619,471 A * | 4/1997 | Nunziata | 365/230.03 |
| 5,822,251 A * | 10/1998 | Bruce et al. | 365/185.33 |
| 6,256,255 B1 | 7/2001 | Keeth et al. | |
| 6,389,520 B2 | 5/2002 | Christenson | |
| 6,415,353 B1 | 7/2002 | Leung | |
| 6,418,063 B1 | 7/2002 | Seitsinger et al. | |
| 6,452,864 B1 | 9/2002 | Condemi et al. | |
| 6,625,685 B1 * | 9/2003 | Cho et al. | 711/5 |
| 6,633,576 B1 * | 10/2003 | Melaragni et al. | 370/412 |
| 6,745,277 B1 * | 6/2004 | Lee et al. | 711/5 |
| 6,779,092 B2 * | 8/2004 | Watts | 711/158 |
| 6,917,620 B1 * | 7/2005 | Sindhu et al. | 370/401 |
| 2003/0046501 A1 * | 3/2003 | Schulz et al. | 711/157 |
| 2003/0115403 A1 * | 6/2003 | Bouchard et al. | 711/5 |
| 2003/0126355 A1 * | 7/2003 | David | 711/105 |
| 2004/0030849 A1 * | 2/2004 | Borkenhagen et al. | 711/156 |
| 2005/0025140 A1 * | 2/2005 | Deforche et al. | 370/363 |

* cited by examiner

Primary Examiner — Gurtej Bansal

(57) ABSTRACT

A memory controller comprises a memory controller core that receives packets of data and generates memory transactions for each of the packets of data. A memory interface transmits each of the memory transactions to one of a plurality of memory banks of a memory. The memory controller directs each of the memory transactions to a different memory bank than an immediately preceding memory transaction.

17 Claims, 6 Drawing Sheets

DYNAMIC RANDOM ACCESS MEMORY CONTROLLER

CROSS-REFERENCE TO RELATED APPLICATIONS

This application is a continuation of U.S. patent application Ser. No. 10/458,049 filed on Jun. 9, 2003. The disclosure of the above application is incorporated herein by reference.

BACKGROUND

The present invention relates generally to memory control. More particularly, the present invention relates to controlling dynamic random access memory having multiple memory banks.

All processors, such as those found in routers and switches, rely on some form of memory for data storage. The two types most commonly employed are static random access memory (SRAM) and dynamic random access memory (DRAM). Because DRAM is cheaper and physically smaller than SRAM, it is employed whenever possible.

SUMMARY

In general, in one aspect, the invention features an apparatus comprising a plurality of ports each adapted to receive packets of data; a memory controller core adapted to generate one or more memory transactions for each of the packets of the data, wherein each memory transaction comprises a payload having a size of m bytes, and wherein the payloads contain the data; a memory comprising a plurality of memory banks adapted to store the data, wherein the memory can receive no more than n bytes of data in a single memory transaction; and a memory interface adapted to transmit the memory transactions to the memory; wherein m=kn and k is an integer.

Particular implementations can include one or more of the following features. k=1. The memory controller core is further adapted to direct each one of the memory transactions corresponding to one of the packets to a different one of the memory banks than the one of the memory banks to which the memory controller core directed the previous one of the memory transactions corresponding to the one of the packets. The memory banks define a plurality of buffers, and wherein the memory controller core is further adapted to direct each one of the memory transactions corresponding to one of the packets to the same buffer of the memory until all of the memory banks at that buffer contain data from the one of the packets. One implementation features a network switch comprising the apparatus. Another implementation features a traffic manager comprising the apparatus. Another implementation features a multi-port media access controller comprising the apparatus.

In general, in one aspect, the invention features a memory controller comprising at least one agent interface, wherein each agent interface is adapted to receive data from a respective memory agent; a memory controller core adapted to generate one or more memory transactions, wherein each memory transaction comprises a payload having a size of m bytes, and wherein the payloads contain the data; and a memory interface adapted to transmit the memory transactions to a memory, wherein the memory comprises a plurality of memory banks and can receive no more than n bytes of the data in a single memory transaction; wherein m=kn and k is an integer.

Particular implementations can include one or more of the following features. k=1. The memory controller core is further adapted to direct each one of the memory transactions to a different one of the memory banks than the one of the memory banks to which the memory controller core directed the previous one of the memory transactions. One implementation features a network switch comprising the memory controller. Another implementation features a traffic manager comprising the memory controller. Another implementation features a multi-port media access controller comprising the memory controller.

In general, in one aspect, the invention features a method and computer program for transmitting data to a memory comprising a plurality of memory banks, wherein the memory can receive no more than n bytes of the data in a single memory transaction. It comprises receiving packets of the data; generating one or more memory transactions for each of the packets of the data, wherein each memory transaction comprises a payload having a size of m bytes, and wherein the payloads contain the data; and transmitting the memory transactions to the memory; wherein m=kn and k is an integer.

Particular implementations can include one or more of the following features. k=1. Implementations comprise directing each one of the memory transactions corresponding to one of the packets to a different one of the memory banks than the one of the memory banks to which the previous one of the memory transactions corresponding to the one of the packets was directed. Implementations comprise directing each one of the memory transactions corresponding to one of the packets to the same buffer of the memory until all of the memory banks at that buffer contain data from the one of the packets.

In general, in one aspect, the invention features a method and computer program for transmitting data from a memory agent to a memory comprising a plurality of memory banks, wherein the memory can receive no more than n bytes of the data in a single memory transaction. It comprises receiving data from the memory agent; generating one or more of the memory transactions, wherein each of the memory transactions comprises a payload having a size of m bytes, and wherein the payloads contain the data; and transmitting the memory transactions to the memory; wherein m=kn and k is an integer.

Particular implementations can include one or more of the following features. k=1. Implementations comprise directing each one of the memory transactions to a different one of the memory banks than the one of the memory banks to which the previous one of the memory transactions was directed.

The details of one or more implementations are set forth in the accompanying drawings and the description below. Other features will be apparent from the description and drawings, and from the claims.

Figure 1:
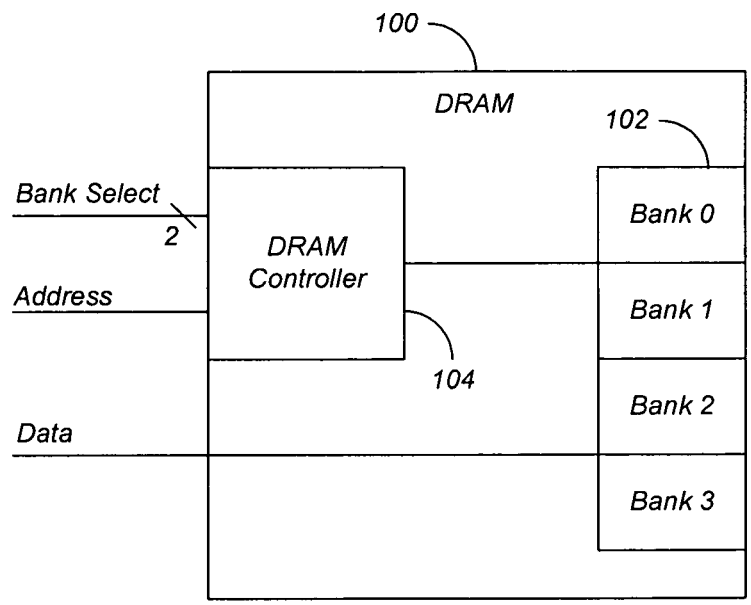
FIG. 1 is a block diagram of a conventional dynamic random access memory (DRAM).

The leading digit(s) of each reference numeral used in this specification indicates the number of the drawing in which the reference numeral first appears.

DETAILED DESCRIPTION

FIG. 1 is a block diagram of a conventional dynamic random access memory (DRAM) 100. DRAM 100 comprises a memory array 102 and a DRAM controller 104. Memory array 102 comprises a plurality of memory cells (not shown) each capable of storing one or more bits of data. The memory cells are arranged into multiple memory banks that are selected by DRAM controller 104 according to a "bank select" control signal. For example, the memory cells can be arranged into four memory banks, shown in FIG. 1 as bank 0 through bank 3, according to a two-bit bank select signal.

One well-known disadvantage of using DRAM is that each access to a memory bank (for example, writing data to the memory bank) requires certain house-keeping tasks be performed before the next access to that memory bank. Therefore two consecutive accesses to different memory banks require less time than two consecutive accesses to the same memory bank. Embodiments of the invention utilize this property of DRAM to increase the overall performance of the DRAM, as described in detail below.

Figure 2:
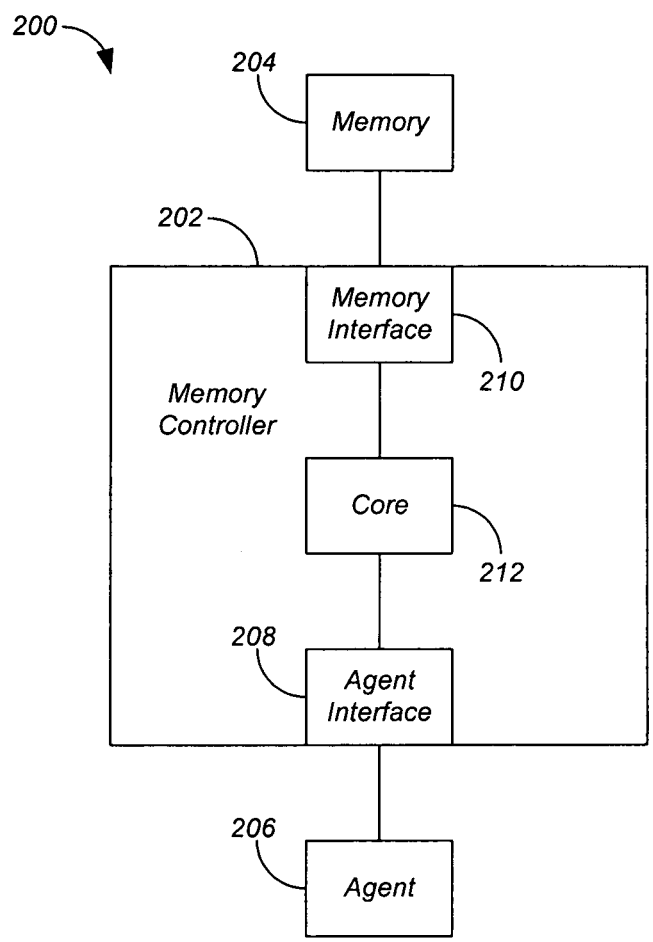
FIG. 2 shows a memory system according to a preferred embodiment.

FIG. 2 shows a memory system 200 according to a preferred embodiment. Memory system 200 comprises a memory controller 202 that provides a memory agent 206 with access to a memory 204 such as DRAM 100 of FIG. 1. Memory controller 202 comprises an agent interface 208 for communicating with memory agent 206, a memory interface 210 for communicating with memory 204, and a memory controller core 212 for passing data between agent interface 208 and memory interface 210. Memory controller 202 can be fabricated using conventional electronic digital logic devices. Agent 206 can be a conventional processor or some other sort of electronic device.

Figure 3:
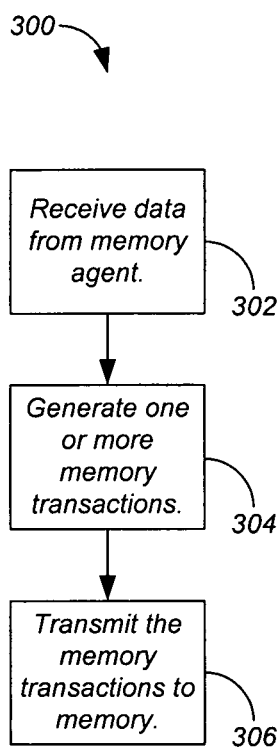
FIG. 3 is a flowchart for a process performed by the memory controller of FIG. 2 according to a preferred embodiment.

FIG. 3 is a flowchart for a process 300 performed by memory controller 202 according to a preferred embodiment. Agent interface 208 of memory controller 202 receives data from memory agent 206 (step 302). Memory controller core 212 generates one or more memory transactions (step 304). Each memory transaction preferably comprises a command and a payload containing some or all of the data received from memory agent 206. Memory interface 210 then transmits the memory transactions to memory 204 (step 306).

Another important property of a DRAM is its burst size, which is the maximum number of bytes n of data that the DRAM can accept in a single memory transaction. In a preferred embodiment, memory controller core 212 fixes the size of the payload of each memory transaction at m bytes, where m=kn and k is an integer. In one embodiment, k=1. This process increases the probability that each memory transaction will access a different memory bank than the previous memory transaction, thereby increasing the performance of memory 204.

In one embodiment, memory controller core 212 ensures that each memory transaction is directed to a different one of the memory banks than the previous memory transaction. This technique is preferably implemented as follows. For each memory transaction, memory controller 202 provides a memory address over a memory address bus to memory 204. One or more lines of the memory bus are supplied to the bank select input of memory 204. For example, assume memory 204 uses 32-bit memory addresses so that, for each memory transaction, memory controller 202 provides a 32-bit memory address [31:0] to memory 204. Further assume that the burst size of memory 204 is 128 bytes. Therefore, according to a preferred embodiment, memory controller core 212 ensures that each memory transaction has a 128-byte payload. Because $128=2^7$, bits 7 and 8 of the address [31:0] bus are connected to the two bank select inputs of memory 204. Therefore consecutive memory transactions are directed to the memory banks in order 0-1-2-3-0-1-2-3 and so on. Of course, it is not necessary to proceed in this order, so long as no memory bank is accessed by two consecutive memory transactions.

Figure 4:
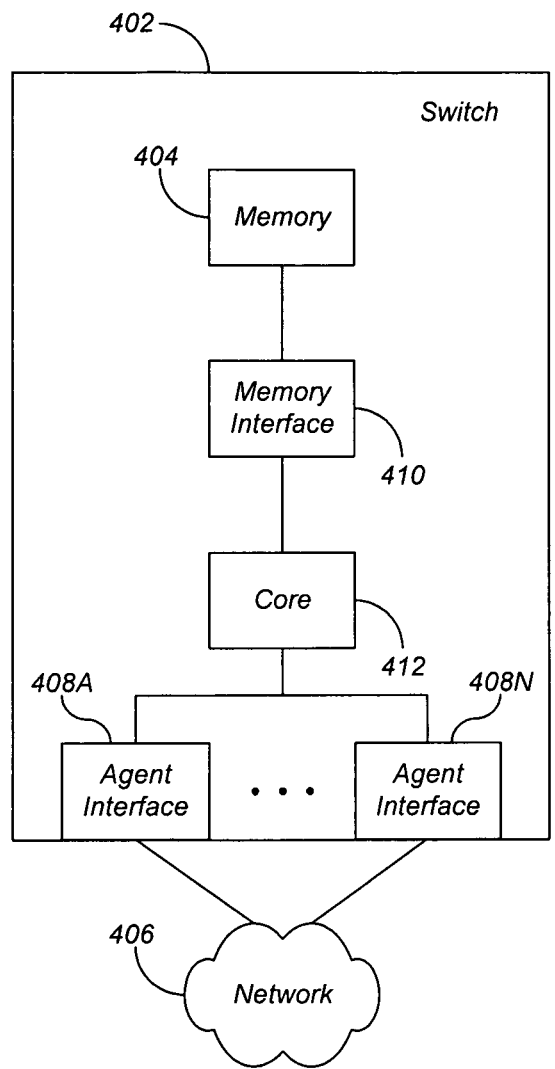
FIG. 4 shows a packet switch connected to a network such as the Internet according to a preferred embodiment.

Embodiments of the invention are particularly useful in network packet switches, but are not limited to switches. For example, embodiments of the invention are also useful in traffic managers, a multi-port media access controllers (MAC), and the like. FIG. 4 shows a packet switch 402 connected to a network 406 such as the Internet according to a preferred embodiment. Packet switch 402 comprises a memory 404 such as DRAM 100 of FIG. 1 and a plurality of ports 408A through 408N that communicate with network 406. Switch 402 also comprises a memory interface 410 for communicating with memory 404, and a memory controller core 412 for passing data between ports 408 and memory interface 410. Memory controller core 412 can be fabricated using conventional electronic digital logic devices. Ports 406 and memory interface 410 can be fabricated according to techniques well-known in the relevant arts.

Figure 5:
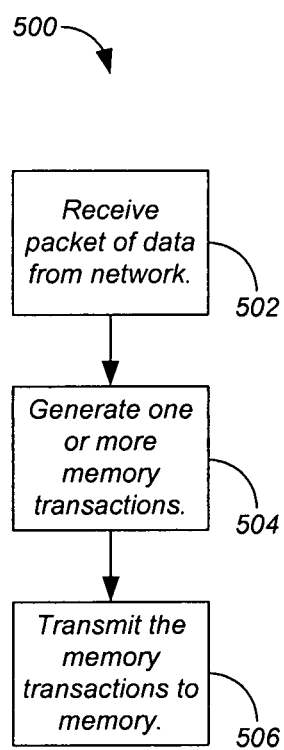
FIG. 5 is a flowchart for a process performed by the switch of FIG. 4 according to a preferred embodiment.

FIG. 5 is a flowchart for a process 500 performed by switch 402 according to a preferred embodiment. A port 408 receives a packet of data from network 406 (step 502). Memory controller core 412 generates one or more memory transactions (step 504). Each memory transaction comprises a command and a payload containing some or all of the data in the packet. Memory interface 410 then transmits the memory transactions to memory 404 (step 506).

As discussed above, an important property of a DRAM is its burst size, which is the maximum number of bytes n of data that the DRAM can accept in a single memory transaction. In a preferred embodiment, memory controller core 412 fixes the size of the payload of each memory transaction at m bytes, where m=kn and k is an integer. In one embodiment, k=1. This process increases the probability that each memory transaction will access a different memory bank than the previous memory transaction, thereby increasing the performance of memory 404.

Of course, the number of bytes of data b in a received packet may not be evenly divisible by the number of bytes of data in the payload of each memory transaction; that is, the remainder of b/m may not be zero. Some DRAMs possess a feature commonly referred to as "interrupted burst," which allows a memory transaction to have a payload that is less than m bytes. If memory 404 does not have the interrupted burst feature, then the payload of the final memory transaction sent to memory 404 for a given packet can be padded with pad data (that is, all ones, all zeroes, or some other bit pattern). In such embodiments, memory controller core 412 tracks the pad so that it is not transmitted when the packet is retrieved from memory for transmission to network 406. For example, memory controller core 412 can record the length of the pad, and then remove the pad when assembling the packet for transmission.

On the other hand, if memory 404 supports interrupted burst, then the payload of the final memory transaction sent to memory 404 for a given packet can be reduced from m bytes. In such embodiments, memory controller core 412 writes the first memory transaction to the first address in the next memory bank to ensure that the payload of each memory transaction is stored in a single memory bank.

In one embodiment, memory controller core 412 ensures that each memory transaction is directed to a different one of the memory banks than the previous memory transaction. This technique is preferably implemented as follows. For each memory transaction, switch 402 provides a memory address over a memory address bus to memory 404. One or more lines of the memory bus are supplied to the bank select input of memory 404. For example, assume memory 404 uses 32-bit memory addresses so that, for each memory transaction, memory controller core 412 provides a 32-bit memory address to memory 404. Further assume that the burst size of memory 404 is 128 bytes. Therefore, according to a preferred embodiment, memory controller core ensures that each memory transaction has a 128-byte payload. Because $128=2^7$, bits 7 and 8 of the address bus are connected to the two bank select inputs of memory 404. Therefore consecutive memory transactions are directed to the memory banks in order 0-1-2-3-0-1-2-3 and so on. Of course, it is not necessary to proceed in this order, so long as no memory bank is accessed by two consecutive memory transactions.

In many conventional packet switches, the memory is divided into equally-sized memory. Each block comprises one or more buffers and is the size of the maximum size of the packets handled by the switch. To ensure that a packet does not overrun a block of memory, conventional switches simply always write the first memory transaction of a packet to the first buffer of the block in the first memory bank. However, in embodiments of the present invention, while the first memory transaction of a packet is written to the first buffer of a memory block, it is often written to a memory bank other than the first memory bank. Therefore, to ensure that a packet does not overrun a memory block, memory controller core 412 ensures that each one of the memory transactions corresponding to a packet is written to the same buffer of the memory until all of the memory banks in that buffer contain data from the packet.

Figure 6:
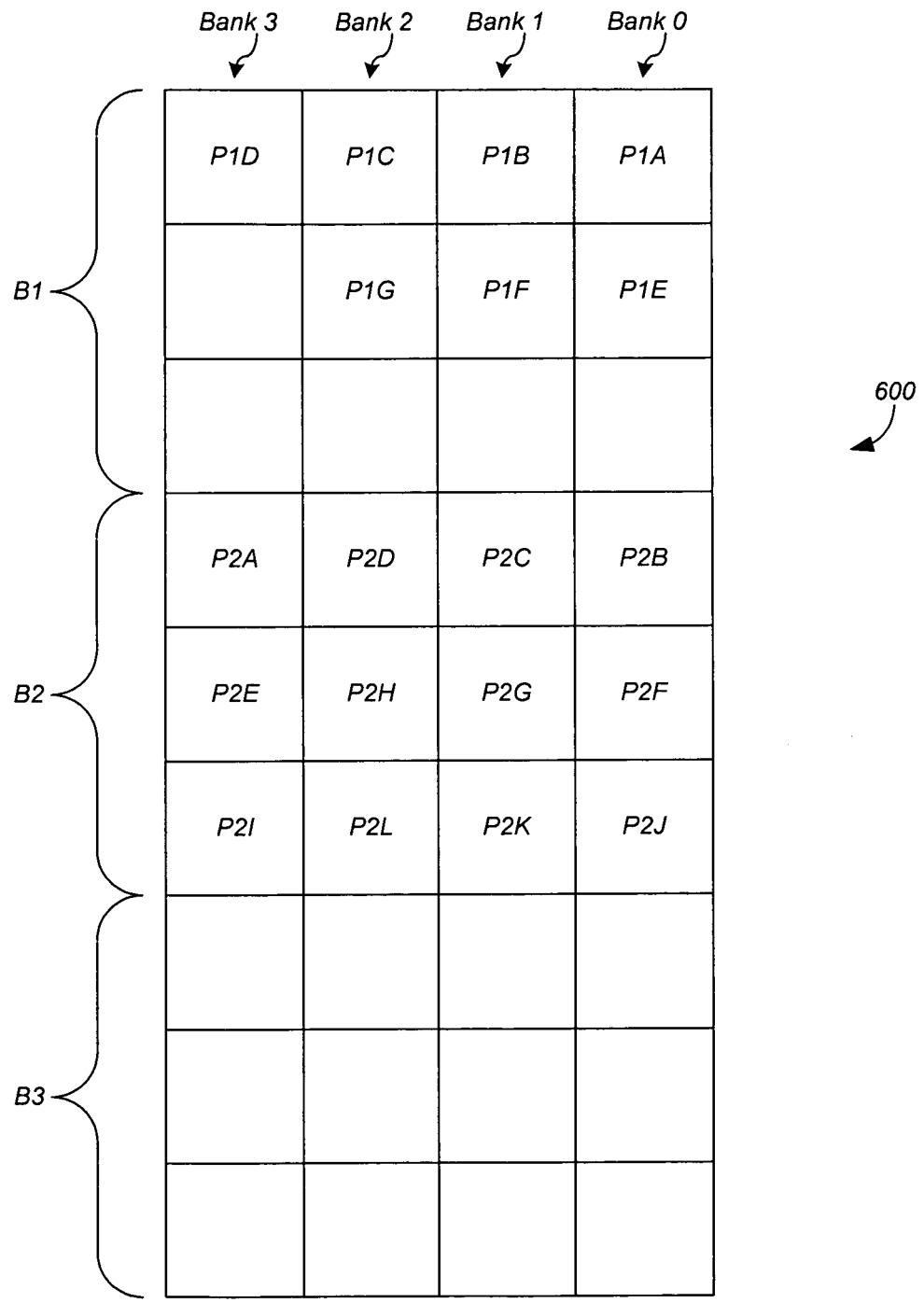
FIG. 6 depicts the memory array of a DRAM such as the memory array of the DRAM of FIG. 1.

An example is useful to explain this technique. FIG. 6 depicts the memory array 600 of a DRAM such as memory array 102 of DRAM 100 of FIG. 1. Each row of memory array 600 represents one memory buffer, with buffer addresses increasing from the top to the bottom of the page. Each column of memory array 600 represents one memory bank. Each cell of memory array 600 is formed by the intersection of one column and one row, and is capable of storing one byte of data. In the depicted example, the maximum packet length is 12 bytes. Therefore, memory array 600 has been divided into three memory blocks B1, B2, and B3, each comprising 12 memory cells.

Referring to FIG. 6, a packet P1 has been stored in block B1 of memory array 600. Packet P1 comprises seven bytes of data, and so has been broken into seven memory transactions, each having a payload of one byte of data. In accordance with embodiments of the invention described above, the payloads of the memory transactions have been stored in memory array 600 in memory bank order 0-1-2-3-0-1-2 as bytes P1A, P1B, P1C, P1D, P1E, P1F and P1G, respectively.

Then a second packet arrives. The second packet has the maximum packet length of 12 bytes. Therefore the second packet is broken into 12 memory transactions. In accordance with embodiments of the invention described above, the payload of the first memory transaction (which generally contains the first byte of data of the packet) is written to the memory bank following the memory bank to which the last byte of the previous packet was written. In particular, referring to FIG. 6, the first byte P2A of the second packet is written to memory bank 3 in the first buffer of block B2.

According to embodiments of the present invention, the next byte P2B of the second packet is written to memory bank 0. However, if byte P2B is written to the second buffer of memory block B2, and so on, the last three bytes of the second packet will overrun memory block B2, and be written to the first buffer of the third memory block, while three cells in the first buffer of memory block B2 will remain unused.

Therefore, according to a preferred embodiment, the payloads P2B, P2C, and P2D of the next three memory transactions are written to banks 0, 1, and 2, respectively, at the first buffer of memory block B2, so that buffer is full. Then the payload P2E of the next memory transaction is written to memory bank 3 at the next buffer. Then, the payloads P2F, P2G, and P2H of the next three memory transactions are written to banks 0, 1, and 2, respectively, at the second buffer of memory block B2, and so on, as shown in FIG. 6, so that the second packet completely fills memory block B2, with no wasted memory cells in memory block B2, and no overrun into memory block B3, while preserving the memory bank order of access to the memory banks (here, 0-1-2-3-0-1-2-3). Of course, these embodiments of the invention can be used regardless of whether memory 404 supports interrupted burst, as will be apparent to one skilled in the relevant arts after reading this description.

Memory controller core 412 can use many techniques to keep track of the order of the packets. For example, for each packet, memory controller core 412 can record, with the packet ID, the buffer and the memory bank where the payload of the first memory transaction for that packet is stored. Then, when the packet is retrieved from memory, the same process used to write the data to memory 404 can be used to retrieve the data, thereby restoring the packet correctly.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Please list any additional modifications or variations. Accordingly, other implementations are within the scope of the following claims.

What is claimed is:

1. A memory controller, comprising:
   a memory controller core configured to i) receive packets of data, and ii) generate memory transactions for each of the packets of data; and
   a memory interface configured to transmit each of the memory transactions to one of a plurality of memory banks of a memory, wherein the memory includes a plurality of blocks of memory, and wherein each of the blocks of memory includes cells arranged i) in rows corresponding to buffers, and ii) in columns corresponding to the memory banks,
   wherein the memory controller is configured to i) direct each of the memory transactions to a different memory bank than an immediately preceding memory transaction, and ii) direct each memory transaction corresponding to one of the packets of data to the same buffer until each of the memory banks corresponding to said same buffer includes data from the one of the packets,
   wherein the memory controller is configured to i) direct a last byte of a first packet of data to a first memory bank in a first buffer, and ii) direct a first byte of a second packet of data to a second memory bank in a second buffer, wherein the second memory bank is located immediately subsequent to the first memory bank, and
   wherein the memory controller is configured to direct a second byte of the second packet of data to a third memory bank in the second buffer and in a same row of the memory as the first byte, and wherein the third memory bank is located sequentially prior to the second memory bank in the second buffer.

2. A network switch comprising the memory controller of claim 1.

3. A traffic manager comprising the memory controller of claim 1.

4. A multi-port media access controller comprising the memory controller of claim 1.

5. The memory controller of claim 1, wherein each of the cells corresponds to an intersection of one of the buffers and one of the memory banks.

6. The memory controller of claim 1, wherein i) each of the packets of data includes a plurality of bytes, and ii) each of the cells is configured to store one of the plurality of bytes.

7. The memory controller of claim 1, wherein each memory transaction includes a payload of m bytes.

8. The memory controller of claim 7, wherein the memory can receive no more than n bytes of data in a single memory transaction.

9. The memory controller of claim 8, wherein m=kn and k is an integer.

10. The memory controller of claim 9, wherein k is greater than 1.

11. A method for operating a memory controller, the method comprising:
    receiving packets of data;
    generating memory transactions for each of the packets of data;
    transmitting each of the memory transactions to one of a plurality of memory banks of a memory, wherein the memory includes a plurality of blocks of memory, wherein each of the blocks of memory includes cells arranged i) in rows corresponding to buffers, and ii) in columns corresponding to the memory banks, and wherein transmitting each of the memory transactions includes i) directing each of the memory transactions to a different memory bank than an immediately preceding memory transaction, and ii) directing each memory transaction corresponding to one of the packets of data to the same buffer until each of the memory banks corresponding to said same buffer includes data from the one of the packets;
    directing a last byte of a first packet of data to a first memory bank in a first buffer;
    directing a first byte of a second packet of data to a second memory bank in a second buffer, wherein the second memory bank is located immediately subsequent to the first memory bank; and
    directing a second byte of the second packet of data to a third memory bank in the second buffer and in a same row of the memory as the first byte, wherein the third memory bank is located sequentially prior to the second memory bank in the second buffer.

12. The method of claim 11, wherein each of the cells corresponds to an intersection of one of the buffers and one of the memory banks.

13. The method of claim 11, wherein i) each of the packets of data includes a plurality of bytes, and ii) each of the cells is configured to store one of the plurality of bytes.

14. The method of claim 11, wherein each memory transaction includes a payload of m bytes.

15. The method of claim 14, wherein the memory can receive no more than n bytes of data in a single memory transaction.

16. The method of claim 15, wherein m=kn and k is an integer.

17. The method of claim 16, wherein k is greater than 1.

* * * * *